(12) United States Patent
Ferrell

(10) Patent No.: US 9,542,015 B2
(45) Date of Patent: Jan. 10, 2017

(54) POINTING DEVICE HAVING COUPLING STRUCTURE

(71) Applicant: Lenovo (Singapore) Pte. Ltd., Singapore (SG)

(72) Inventor: Michael David Ferrell, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/330,821

(22) Filed: Jul. 14, 2014

(65) Prior Publication Data

US 2016/0011681 A1   Jan. 14, 2016

(51) Int. Cl.
*G06F 3/0354* (2013.01)
*G06F 1/16* (2006.01)

(52) U.S. Cl.
CPC ......... *G06F 3/03545* (2013.01); *G06F 1/1684* (2013.01)

(58) Field of Classification Search
None
See application file for complete search history.

(56) References Cited

U.S. PATENT DOCUMENTS

| 7,536,210 B1 * | 5/2009 | Morris | G06F 1/1626 455/575.1 |
| 2009/0115745 A1 * | 5/2009 | Chuang | G06F 1/1626 345/179 |

* cited by examiner

*Primary Examiner* — David D Davis
(74) *Attorney, Agent, or Firm* — Schwegman Lundberg & Woessner, P.A.

(57) ABSTRACT

A pointing device includes a shaft having an elongated shape suitable for gripping by a user, a pointing tip coupled to a first end of the shaft for interacting with an input surface of a tablet computing device, and a hook coupled to a second end of the shaft, the hook having a first portion extending away from the shaft, and a second portion coupled to the first portion distal from the shaft and extending from the first portion generally toward the first end of the shaft such that the hook is adapted to fit a depth of the tablet computing device and retentively and removably couple the pointing device to the tablet computing device.

19 Claims, 3 Drawing Sheets

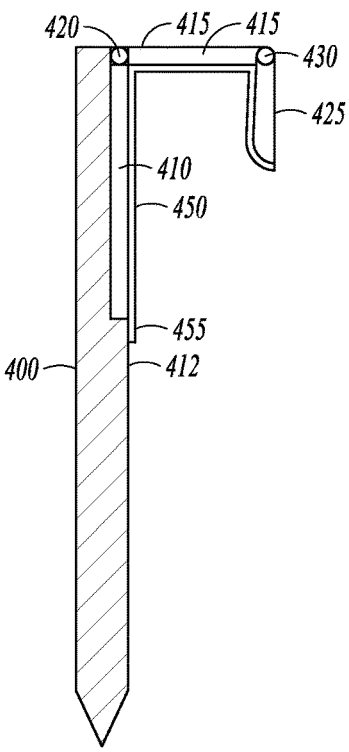
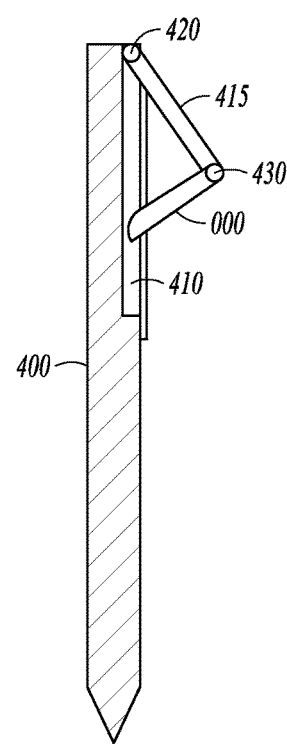
FIG. 4    FIG. 5
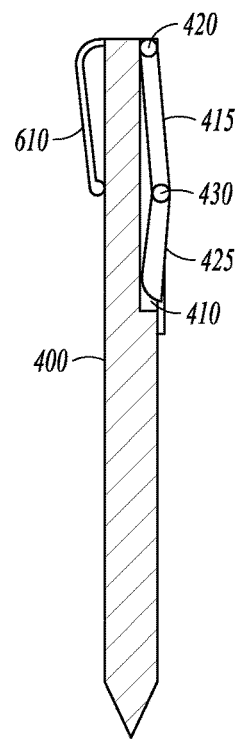
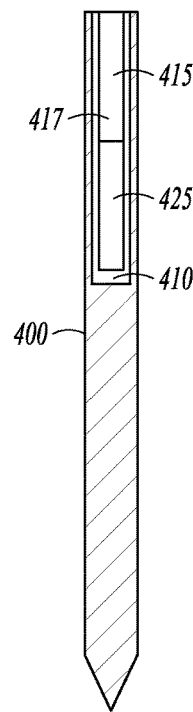
FIG. 6    FIG. 7

POINTING DEVICE HAVING COUPLING STRUCTURE

BACKGROUND

Many users of tablet computing devices utilize pointing devices such as smart pens. Some tablet devices have structures, such as shafts to house a pointing device to help a user keep from misplacing the pointing device. Many tablets lack such structures, leaving it to the user to find a place to store the pointing device when not in use.

SUMMARY

A pointing device includes a shaft having an elongated shape suitable for gripping by a user, a pointing tip coupled to a first end of the shaft for interacting with an input surface of a tablet computing device, and a hook coupled to a second end of the shaft, the hook having a first portion extending away from the shaft, and a second portion coupled to the first portion distal from the shaft and extending from the first portion generally toward the first end of the shaft such that the hook is adapted to fit a depth of the tablet computing device and retentively and removably couple the pointing device to the tablet computing device.

A pointing device include a digitizing pen having a shaft with an elongated shape suitable for gripping by a user, a pointing tip coupled to a first end of the shaft for interacting with an input surface of a tablet computing device, and a hook coupled to a second end of the shaft, the hook having a first portion to extend away from the shaft, and a second portion coupled to the first portion distal from the shaft to extend from the first portion generally toward the first end of the shaft such that the second portion of the hook is separated from the shaft a distance corresponding to a depth of the tablet and is positioned to retentively and removably couple the pointing device to the tablet computing device.

A system includes a mobile computing device having a processor, memory, and display surface supported by a housing having a length, width, and depth. A pointing device includes a shaft having an elongated shape suitable for gripping by a user, a pointing tip coupled to a first end of the shaft for interacting with an input surface of the mobile computing device, and a hook coupled to a second end of the shaft, the hook having a first portion extending away from the shaft, and a second portion coupled to the first portion distal from the shaft and extending from the first portion generally toward the first end of the shaft such that the hook is adapted to fit the depth of the mobile computing device and retentively and removably couple the pointing device to the mobile computing device.

BRIEF DESCRIPTION OF THE DRAWINGS

FIGS. 4, 5, and 6 are side cross sections of an alternative pointing device showing a collapsible hook in various positions according to an example embodiment.

FIG. 7 is a side view of the pointing device illustrating a hook at least partially within a trough in the pointing device according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A pointing device has a hook adapted to attach the pointing device to a tablet type of computing device to ensure that the pointing device is available to a user of the tablet computing device. In some embodiments, the pointing device is a simple pointing device, such as a stylus with no electronics. In further embodiments, the pointing device may be a digital pen having active pen technology designed to interact with a display of the tablet or tablet like computing device without any special modification of the display such as a digitizer layer. The pointing device may include proximity and motion sensors to detect pointing device motion. Sensors to detect hand presence may also be provided. Gesture recognition algorithms may leverage the sensors to recognize gestures. In some embodiments, the nib combined with the tablet display may be selected to create friction between the two similar to pen and paper friction.

The tablet may be any size of tablet computing device such as an IPad, Nook, Galaxy, or even a mobile communication device including smart phone. Such devices are currently ubiquitous, and are generally thicker than several sheets of paper that prior clips were designed for. However, the tablet type devices are generally thinner than a thickness required to have a hole sufficient to hold a pointing device having a size to facilitate electronics and user preferences for a writing type of pointing device.

Figure 1:
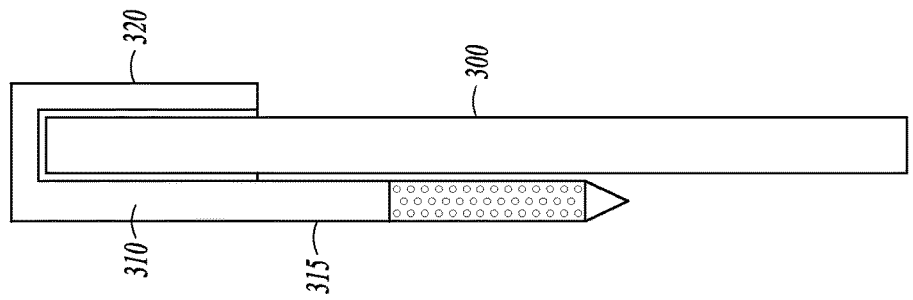
FIG. 1 is a side view of a pointing device with a tablet sized hook according to an example embodiment.

FIG. 1 is a side view of a pointing device 100. Pointing device 100 may include a shaft 110 having an elongated shape suitable for gripping by a user. A pointing tip 115, also referred to as a nib, is coupled to a first end 117 of the shaft 110 for interacting with an input surface of a tablet computing device. A hook 120 is coupled to a second end 125 of the shaft 110. The hook 120 may have a first portion 130 extending away from the shaft 110, and a second portion 135 coupled to the first portion 130 distal from the shaft 110 and extending from the first portion 130 generally toward the first end 117 of the shaft such that the hook 120 is adapted to fit a depth of the tablet computing device indicated by arrow 140 and retentively and removably couple the pointing device to the tablet computing device. Typical tablets today have a housing with a depth or thickness that is about 0.35 inches (0.89 cm) to 0.4 inches (1.0 cm).

In one embodiment, the first portion 130 and second portion 135 of the hook 110 are formed of a ridged plastic material or other suitable material such as metal or a combination of metal and polymer materials. The spacing of the first portion 130 and second portion 135 of the hook 110 may be formed such that the second portion 135 is spring loaded against the tablet computing device when coupled to the tablet.

In one embodiment, the second portion 135 has a first side facing the shaft 110 having a soft compliant portion 145 to grip the tablet computing device when the pointing device 100 is attached to the tablet computing device. The shaft 110 may also have a soft compliant portion 150 on a side of the shaft facing the second portion 135 of the hook to grip the tablet computing device when the point device is attached to the tablet computing device. The first portion 130 of the hook may also have a soft compliant portion 155 on a side of the first portion 130 of the hook facing the first side of the second portion 135 of the hook and soft compliant portion 150 on the shaft.

The soft compliant portions form an inseam of the hook and may be compressible and also help provide a spring loaded effect of the hook 110 via such compression when the pointing device 100 is coupled to the tablet computing device by compressing. The soft compliant portions ay also protect a screen of the tablet computing device from being scratched or otherwise damaged by the hook 120. In a further embodiment, the pointing device 100 may include a textured area 160 of the shaft 110 to facilitate user handling of the pointing device 100. The textured area may include dimples and may further include a tacky material, which may also be compliant.

Figure 2:
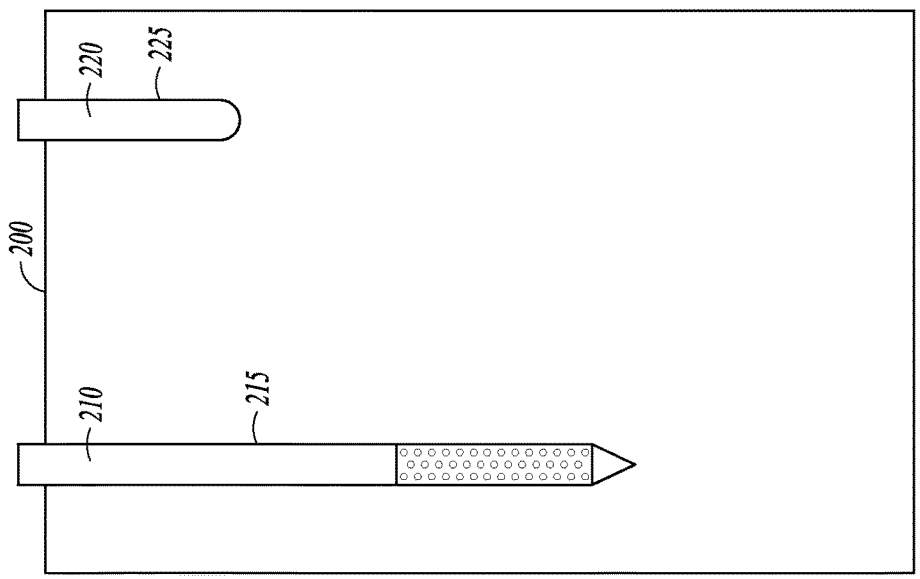
FIG. 2 is a top view of a tablet having multiple pointing devices hooked to the tablet computing device according to an example embodiment.

FIG. 2 is a view of a tablet type computing device 200 having two coupled pointing devices coupled in different orientations. A first pointing device is shown at 210 with a shaft 215 visible. The view of the tablet computing device 200 illustrated represents either a front or display side of the tablet, or a back side of the tablet. The hook is on the other side of the tablet and is not visible. A second pointing device is shown at 220, with only a hook 225 visible. The shaft is on the other side of the tablet and is not visible.

Figure 3:
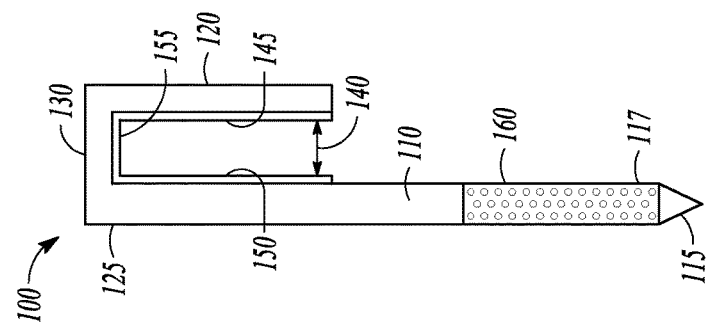
FIG. 3 is a side view of a pointing device shown attached to a tablet computing device according to an example embodiment.

FIG. 3 is a side view of a tablet type computing device 300. A pointing device 310 is shown coupled to the tablet 300 with a shaft 315 on one side, and a hook 320 on the other side. The pointing device may be coupled with the shaft residing on either side of the tablet 300 in various embodiments.

FIGS. 4, 5, and 6 are side view cross sections of an alternative pointing device 400. Pointing device 400 includes a chamber or trough 410 formed in a shaft 412 of the pointing device. A first portion 415 of a hook 417 is coupled to the shaft 412 via a first hinge 420 formed on a first end of the shaft 412. A second portion 425 of the hook 417 is coupled to the first portion 415 of the hook via a second hinge 430 formed on an end of the first portion 415 of the hook. The first hinge 420 is adapted to allow the first portion 415 of the hook 417 to rotate toward the shaft 412 and to prevent rotation of the hook 417 away from the shaft 412 further than approximately perpendicular to the shaft 412. A stop may be used in the hinge to prevent further rotation. Approximately perpendicular means that the first portion 415 rotates sufficiently far enough from the shaft 412 to provide suitable spacing for the second portion 425 to retentively engage the tablet in opposition to the shaft 412.

In one embodiment, the second hinge 430 is adapted to allow the second portion 425 of the hook to rotate such that it is in line with the first portion 415 of the hook and to lock into a position to enable the hook 417 to retentively couple the pointing device to the tablet computing device. A stop may also be used to perform the lock function by simply preventing the second portion of the hook from rotating beyond the point that it will no longer function to retentively couple the pointing device to the tablet computing device. Note that the tablet itself will prevent rotation toward the trough 410 such that the second portion is effectively locked.

The trough 410 is positioned to receive the first and second portions of the hook when rotated toward the shaft as illustrated in FIGS. 5 and 6, which show the hook 417 in positions facilitating storage of the hook for use by the user as a pointing device. Storing the hook in that manner such that the first and second portions fit at least partially within the trough 410 may provide a pen like feel to the user without interference by the hook in some embodiments.

FIG. 6 also illustrates a clip 610, which may be formed in manner similar to clips on regular writing pens and suitable for clipping the pointing device to a few sheets of paper or a shirt pocket.

FIG. 7 is a side view of the pointing device 400 illustrating a view of the hook 417 at least partially inserted into the trough 410. The first and second portions 415, 425 of the hook may be narrower than the shaft 412 such that they fit at least partially within the trough 410.

Figure 8:
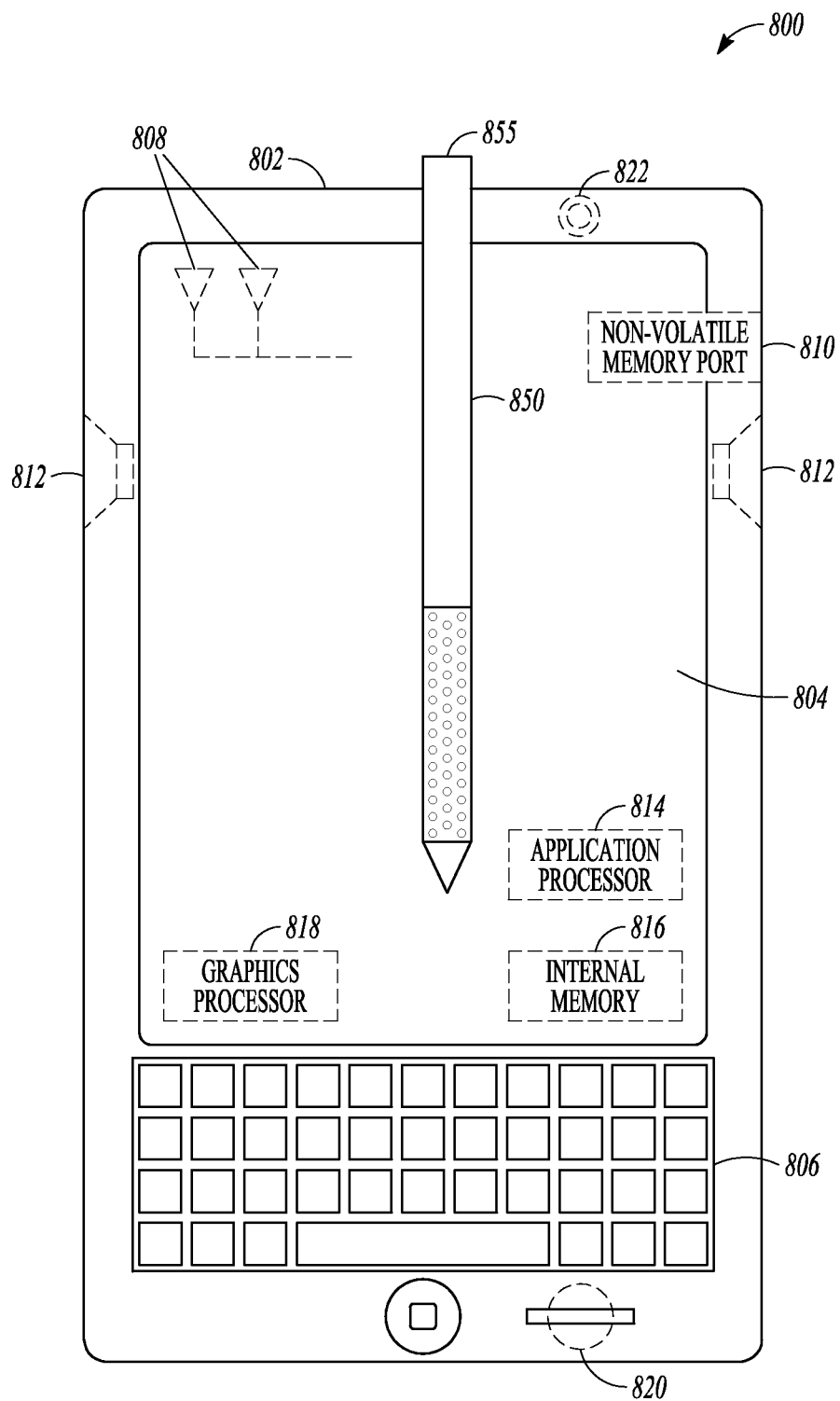
FIG. 8 is a block diagram of a tablet device having a pointing device with hook according to an example embodiment.

FIG. 8 is a block diagram of a mobile device 800 having a pointing device with hook according to an example embodiment. The mobile device may be a tablet type of device or a smart phone in various embodiments. The mobile device 800 may include one or more antennas 808 within housing 802 that are configured to communicate with a hotspot, base station (BS), an evolved NodeB (eNodeB), or other type of WLAN or WWAN access point. The mobile device may be configured to communicate using multiple wireless communication standards, including standards selected from 3GPP LTE/LTE-A, WiMAX, High Speed Packet Access (HSPA), Bluetooth, and Wi-Fi standard definitions. The mobile device 800 may communicate using separate antennas for each wireless communication standard or shared antennas for multiple wireless communication standards. The mobile device 800 may communicate in a WLAN, a WPAN, and/or a WWAN.

FIG. 8 also provides an illustration of a microphone 820 and one or more speakers 812 that may be used for audio input and output from the mobile device 800. A display screen 804 may be a liquid crystal display (LCD) screen, or other type of display screen such as an organic light emitting diode (OLED) display. The display screen 804 may be configured as a touch screen. The touch screen may use capacitive, resistive, or another type of touch screen technology, and may optionally include a digitizer layer, also represented at 804. An application processor 814 and a graphics processor 818 may be coupled to internal memory 816 to provide processing and display capabilities. A non-volatile memory port 810 may also be used to provide data input/output options to a user. The non-volatile memory port 810 may also be used to expand the memory capabilities of the mobile device 800. A keyboard 806 may be integrated with the mobile device 800 or wirelessly connected to the mobile device 800 to provide additional user input. A virtual keyboard may also be provided using the touch screen. A camera 822 located on the front (display screen) side or the rear side of the mobile device 800 may also be integrated into the housing 802 of the mobile device 800.

In one embodiment, a pointing device 850 is shown coupled to the mobile device 800 utilizing a hook 855. The hook 855 is adapted to fit a depth of the mobile device 800, such as a tablet computing device, and removably couple the pointing device to the tablet computing device. Typical tablets today have a thickness that is about 0.35 inches (0.89 cm) to 0.4 inches (1.0 cm).

In one embodiment, the pointing device 850 is a simple pointing device, such as a stylus with no electronics, relying on a digitizer layer in the mobile device 800 to detect interaction with the touch screen 804. In further embodiments, the pointing device 850 may be a digital pen having active pen technology designed to interact with a display of the mobile device 800 such as a tablet or tablet like computing device without any special modification of the display such as a digitizer layer.

EXAMPLES

1. A pointing device comprising:
a shaft having an elongated shape suitable for gripping by a user;
a pointing tip coupled to a first end of the shaft for interacting with an input surface of a tablet computing device; and
a hook coupled to a second end of the shaft, the hook having a first portion extending away from the shaft, and a second portion coupled to the first portion distal from the shaft and extending from the first portion generally toward the first end of the shaft such that the hook is adapted to fit a depth of the tablet computing device and retentively and removably couple the pointing device to the tablet computing device.

2. The pointing device of example 1 wherein the first portion and second portion of the hook are formed of a ridged plastic material.

3. The pointing device of any of examples 1-2 wherein the first portion and second portion of the hook are coupled to the shaft such that the second portion is spring loaded against the tablet computing device when coupled to the tablet.

4. The pointing device of any of examples 1-3 wherein the second portion has a first side facing the shaft, the first side of the second portion having a soft compliant portion to grip the tablet computing device when the pointing device is attached to the tablet computing device.

5. The pointing device of example 4 wherein the shaft has a soft compliant portion on a side of the shaft facing the second portion of the hook to grip the tablet when the point device is attached to the tablet computing device.

6. The pointing device of example 5 wherein the first portion of the hook has a soft compliant portion on a side of the first portion of the hook facing the first side of the second portion of the hook and soft compliant portion on the shaft.

7. The pointing device of any of examples 1-6 wherein the first portion of the hook is coupled to the shaft via a first hinge, and the second portion of the hook is coupled to the first portion of the hook via a second hinge.

8. The pointing device of example 7 wherein the first hinge is adapted to allow the first portion of the hook to rotate toward the shaft and to prevent rotation of the hook away from the shaft further than approximately perpendicular to the shaft.

9. The pointing device of example 8 wherein the second hinge is adapted to allow the second portion of the hook to rotate such that it is in line with the first portion of the hook and to lock into a position to enable the hook to retentively couple the pointing device to the tablet computing device.

10. The pointing device of example 9 wherein the shaft further comprises a trough positioned to receive the first and second portions of the hook when rotated toward the shaft.

11. The pointing device of example 10 wherein the first and second portions of the hook are narrower than the shaft such that they fit at least partially within the trough.

12. The pointing device of any of examples 1-11 wherein the shaft comprises a digitizer pen.

13. The pointing device of any of examples 1-12 and further comprising a clip coupled to the shaft and adapted to hold the pointing device in a shirt pocket.

14. A pointing device comprising:
a digitizing pen having a shaft with an elongated shape suitable for gripping by a user;
a pointing tip coupled to a first end of the shaft for interacting with an input surface of a tablet computing device; and
a hook coupled to a second end of the shaft, the hook having a first portion to extend away from the shaft, and a second portion coupled to the first portion distal from the shaft to extend from the first portion generally toward the first end of the shaft such that the second portion of the hook is separated from the shaft a distance corresponding to a depth of the tablet and is positioned to retentively and removably couple the pointing device to the tablet computing device.

15. The pointing device of example 14 wherein the first portion and second portion of the hook are formed of a ridged plastic material and further comprising a soft compliant portion positioned on the first portion of the hook and side of the shaft facing the first portion of the hook such that the soft compliant portion is in contact with the tablet computing device when the point device is coupled to the tablet computing device.

16. The pointing device of example 15 wherein the first portion of the hook is coupled to the shaft via a first hinge, and the second portion of the hook is coupled to the first portion of the hook via a second hinge, wherein the first hinge is adapted to allow the first portion of the hook to rotate toward the shaft and to prevent rotation of the hook away from the shaft further than approximately perpendicular to the shaft, and wherein the second hinge is adapted to allow the second portion of the hook to rotate such that it is in line with the first portion of the hook and to lock into a position to enable the hook to retentively couple the pointing device to the tablet computing device.

17. The pointing device of example 16 wherein the shaft further comprises a trough positioned to receive the first and second portions of the hook when rotated toward the shaft and wherein the first and second portions of the hook are narrower than the shaft such that they fit at least partially within the trough.

18. A method comprising:
forming a first hinge on a first end of a body of a pointing device;
coupling a first portion of a hook to the first hinge such that the first portion is rotatable toward and away from the body of the pointing device;
forming a second hinge on a the first portion of the hook on an end distal from the first hinge; and
coupling a second portion of the hook to the second hinge such that the second portion is rotatable and lockable with respect to the first portion of the hook to allow the hook to move between a substantially straight position and an extended position adapted to couple the pointing device to a tablet computing device.

19. The method of example 18 wherein the extended position of the hook is spring loaded against the tablet computing device when the pointing device is coupled to the tablet computing device.

20. The method of any of examples 18-19 and further comprising forming a trough in the body of the pointing device to receive the first and second portions of the hook when rotated toward the body, wherein the first and second portions of the hook are formed such that they fit at least partially within the trough.

21. A system comprising:
a mobile computing device having a processor, memory, and display surface supported by a housing having a length, width, and depth; and
a pointing device comprising:
a shaft having an elongated shape suitable for gripping by a user;
a pointing tip coupled to a first end of the shaft for interacting with an input surface of the mobile computing device; and
a hook coupled to a second end of the shaft, the hook having a first portion extending away from the shaft, and a second portion coupled to the first portion distal from the shaft and extending from the first portion generally toward the first end of the shaft such that the hook is adapted to fit the depth of the mobile computing device and retentively and removably couple the pointing device to the mobile computing device.

21. The system of example 20 wherein the first portion and second portion of the hook are coupled to the shaft such that the second portion is spring loaded against the mobile computing device when coupled to the tablet, and wherein the mobile computing device depth is about 0.35 inches (0.89 cm) to 0.4 inches (1.0 cm).

22. The system of any of examples 20-21 wherein the mobile computing device display surface comprises a digitizing layer that interacts with the pointing device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A pointing device comprising:
a shaft having an elongated shape suitable for gripping by a user;
a pointing tip coupled to a first end of the shaft for interacting with an input surface of a tablet computing device; and
a hook coupled to a second end of the shaft, the hook having a first portion extending away from the shaft, and a second portion coupled to the first portion distal from the shaft and extending from the first portion generally toward the first end of the shaft such that the hook has a depth that fits a depth of the tablet computing device and retentively and removably couples the pointing device to the tablet computing device, and wherein the first portion of the hook is coupled to the shaft via a first hinge, and the second portion of the hook is coupled to the first portion of the hook via a second hinge.

2. The pointing device of claim 1 wherein the first portion and second portion of the hook are formed of a ridged plastic material.

3. The pointing device of claim 1 wherein the second portion has a first side facing the shaft, the first side of the second portion having a soft compliant portion to grip the tablet computing device when the pointing device is attached to the tablet computing device.

4. The pointing device of claim 3 wherein the shaft has a soft compliant portion on a side of the shaft facing the second portion of the hook to grip the tablet when the point device is attached to the tablet computing device.

5. The pointing device of claim 4 wherein the first portion of the hook has a soft compliant portion on a side of the first portion of the hook facing the first side of the second portion of the hook and soft compliant portion on the shaft.

6. The pointing device of claim 1 wherein the first hinge is adapted to allow the first portion of the hook to rotate toward the shaft and to prevent rotation of the hook away from the shaft further than approximately perpendicular to the shaft.

7. The pointing device of claim 6 wherein the second hinge is adapted to allow the second portion of the hook to rotate such that it is in line with the first portion of the hook and to lock into a position to enable the hook to retentively couple the pointing device to the tablet computing device.

8. The pointing device of claim 7 wherein the shaft further comprises a trough positioned to receive the first and second portions of the hook when rotated toward the shaft.

9. The pointing device of claim 8 wherein the first and second portions of the hook are narrower than the shaft such that they fit at least partially within the trough.

10. The pointing device of claim 1 wherein the shaft comprises a digitizer pen.

11. The pointing device of claim 1 and further comprising a clip coupled to the shaft and adapted to hold the pointing device in a shirt pocket.

12. A pointing device comprising:
a shaft having an elongated shape suitable for gripping by a user;
a pointing tip coupled to a first end of the shaft for interacting with an input surface of a tablet computing device; and
a hook coupled to a second end of the shaft, the hook having a first portion extending away from the shaft, and a second portion coupled to the first portion distal from the shaft and extending from the first portion generally toward the first end of the shaft such that the hook has a depth that fits a depth of the tablet computing device and retentively and removably couples the pointing device to the tablet computing device, and wherein the first portion and second portion of the hook are coupled to the shaft such that the second portion is spring loaded against the tablet computing device when coupled to the tablet, and wherein the depth of the computing device corresponds to the distance between a front display side and a back side of the computing device.

13. A pointing device comprising:
a digitizing pen having a shaft with an elongated shape suitable for gripping by a user;
a pointing tip coupled to a first end of the shaft for interacting with an input surface of a tablet computing device; and
a hook coupled to a second end of the shaft, the hook having a first portion to -extend away from the shaft, and a second portion coupled to the first portion distal from the shaft to extend from the first portion generally toward the first end of the shaft such that the second portion of the hook is separated from the shaft a distance corresponding to a depth of the tablet and is positioned to retentively and removably couple the pointing device to the tablet computing device, and wherein the depth of the tablet corresponds to a distance between a front display side of the tablet and a back side of the tablet.

14. The pointing device of claim 13 wherein the first portion and second portion of the hook are formed of a ridged plastic material and further comprising a soft compliant portion positioned on the first portion of the hook and side of the shaft facing the first portion of the hook such that the soft compliant portion is in contact with the tablet computing device when the point device is coupled to the tablet computing device.

15. The pointing device of claim 14 wherein the first portion of the hook is coupled to the shaft via a first hinge, and the second portion of the hook is coupled to the first portion of the hook via a second hinge, wherein the first hinge is adapted to allow the first portion of the hook to rotate toward the shaft and to prevent rotation of the hook away from the shaft further than approximately perpendicular to the shaft, and wherein the second hinge is adapted to allow the second portion of the hook to rotate such that it is in line with the first portion of the hook and to lock into a position to enable the hook to retentively couple the pointing device to the tablet computing device.

16. The pointing device of claim 15 wherein the shaft further comprises a trough positioned to receive the first and second portions of the hook when rotated toward the shaft and wherein the first and second portions of the hook are narrower than the shaft such that they fit at least partially within the trough.

17. A system comprising:
 a mobile computing device having a processor, memory, and display surface supported by a housing having a length, width, and depth; and
 a pointing device comprising:
  a shaft having an elongated shape suitable for gripping by a user;
  a pointing tip coupled to a first end of the shaft for interacting with an input surface of the mobile computing device; and
  a hook coupled to a second end of the shaft, the hook having a first portion extending away from the shaft, and a second portion coupled to the first portion distal from the shaft and extending from the first portion generally toward the first end of the shaft such that the hook has a depth that fits the depth of the mobile computing device and retentively and removably couples the pointing device to the mobile computing device, wherein the depth of the tablet corresponds to a distance between a front display side of the tablet and a back side of the tablet.

18. The system of claim 17 wherein the first portion and second portion of the hook are coupled to the shaft such that the second portion is spring loaded against the mobile computing device when coupled to the tablet, and wherein the mobile computing device depth is about 0.35 inches (0.89 cm) to 0.4 inches (1.0 cm).

19. The system of claim 17 wherein the mobile computing device display surface comprises a digitizing layer that interacts with the pointing device.

* * * * *